United States Patent [19]

Friedmann et al.

[11] Patent Number: 5,242,328
[45] Date of Patent: Sep. 7, 1993

[54] TWO-MOSS FLYWHEEL TORSIONAL DAMPER HAVING A WELDED HOUSING

[75] Inventors: Oswald Friedmann, Lichtenau; Egon Zapf, Bühlertal, both of Fed. Rep. of Germany

[73] Assignee: LUK Lamellen und Kupplungsbau GmbH, Bühl, Fed. Rep. of Germany

[21] Appl. No.: 517,535

[22] Filed: Apr. 24, 1990

Related U.S. Application Data

[63] Continuation of Ser. No. 69,525, Jul. 2, 1987, abandoned.

[30] Foreign Application Priority Data

Jul. 5, 1986 [DE] Fed. Rep. of Germany ....... 3622697
Oct. 4, 1986 [DE] Fed. Rep. of Germany ....... 3633871
Dec. 13, 1986 [DE] Fed. Rep. of Germany ....... 3642686

[51] Int. Cl.$^5$ .......................... F16D 3/14; F16D 3/80; F16F 15/10
[52] U.S. Cl. ...................... 464/24; 74/574; 192/106.2; 464/67; 464/68
[58] Field of Search ............ 464/64, 66, 67, 68, 464/24, 27; 192/106.2; 74/574

[56] References Cited

U.S. PATENT DOCUMENTS 4,588,058 5/1986 Aliouate ........................... 464/68 X
4,828,533 5/1989 Focqueur et al. ............... 74/574 X

FOREIGN PATENT DOCUMENTS 2808058 8/1978 Fed. Rep. of Germany ... 192/106.2
53192 12/1922 Sweden .................. 464/67
2036925 7/1980 United Kingdom .......... 464/66
2175067 11/1986 United Kingdom .......... 192/106.2

Primary Examiner—Daniel P. Stodola
Assistant Examiner—William G. Battista, Jr.
Attorney, Agent, or Firm—Peter K. Kontler

[57] ABSTRACT

Apparatus for damping vibrations between at least two flywheels in the power train of a motor vehicle wherein one flywheel rotates with the output shaft of the engine and another flywheel can drive the input shaft of a transmission in response to engagement of a friction clutch. The flywheels are rotatable relative to each other against the opposition of one or more dampers which are installed in an annular chamber of the one flywheel. The chamber contains a supply of viscous damping fluid and the one flywheel has two disc-shaped sections which are made of sheet metal and define the chamber. The sections are welded to each other radially outwardly of the chamber.

17 Claims, 3 Drawing Sheets

10 # TWO-MOSS FLYWHEEL TORSIONAL DAMPER HAVING A WELDED HOUSING

This application is a continuation of application Ser. No. 069,525, filed Jul. 2, 1987, now abandoned.

CROSS-REFERENCE TO RELATED CASES

The apparatus of the present invention is similar to those disclosed in the commonly owned copending patent application Ser. No. 626,384 filed Dec. 12, 1990, now pending, which is continuation of Ser. No. 434,524 filed Nov. 7, 1989, now abandoned, which is a continuation of Ser. No. 063,301 filed Jun. 17, 1987 by Oswald Friedmann and Johann Jäckel for "Apparatus for damping vibrations". Additional apparatus for damping vibrations are disclosed in numerous other pending United States patent applications and in numerous United States and foreign Letters Patent of the assignee.

BACKGROUND OF THE INVENTION

The invention relates to apparatus for damping vibrations, especially for damping torsional vibrations in the power trains of motor vehicles and the like. More particularly, the invention relates to improvements in apparatus for damping angular movements of a first rotary component relative to a second rotary component, for example, for damping torsion-induced angular movements of the crankshaft of an internal combustion engine relative to the input shaft of a change-speed transmission in a motor vehicle and/or vice versa. Still more particularly, the invention relates to improvements in vibration damping apparatus of the type wherein one or more dampers operate between the components of a composite flywheel and the damper or dampers are installed in a chamber for reception of a supply of a viscous fluid medium, for example, a fluid medium of pasty consistency which at least partially fills the chamber A drawback of presently known apparatus of the above outlined character is that their initial cost is high, due in part to complexity of the assembling operation. Moreover, sealing of the chamber from the atmosphere is a time-consuming operation and the coupling of two or more components of a composite flywheel to each other also presents numerous problems.

OBJECTS AND SUMMARY OF THE INVENTION

An object of the invention is to provide a torsional vibration damping apparatus which can be constructed and assembled in a simple, time-saving and economical way.

Another object of the invention is to provide a novel and improved flywheel for use in the above outlined apparatus.

A further object of the invention is to provide an apparatus wherein the chamber for a supply of viscous fluid medium in the composite flywheel can be sealed from the atmosphere at a low cost and without the need for numerous sealing rings and like parts.

An additional object of the invention is to provide an apparatus wherein proper sealing of a portion at least of the chamber takes place in automatic response to completion of the assembly of a flywheel.

Still another object of the invention is to provide an apparatus wherein the wear upon parts which move relative to each other is reduced in a simple and economical manner.

Another object of the invention is to provide an apparatus whose useful life is longer than that of conventional apparatus and which is more efficient and more effective as a means for damping vibrations than heretofore known apparatus.

An additional object of the invention is to provide a novel and improved method of connecting discrete sections of the housing for the fluid-confining chamber to each other.

A further object of the invention is to provide the apparatus with novel and improved means for enhancing the viscous or hydraulic damping action and with novel and improved means for enhancing the frictional damping action.

Another object of the invention is to provide the apparatus with novel and improved means for transmitting torque between neighboring parts and with novel and improved means for locating various component parts in predetermined radial, angular and/or axial positions relative to each other.

The invention resides in the provision of an apparatus for damping vibrations. The apparatus comprises a composite flywheel or mass having two or more components which are rotatable relative to each other and include a first component connectable to the output element (e.g., a crankshaft) of an internal combustion engine and a second component connectable (e.g., by way of a friction clutch) to the input element of the change-speed transmission in a motor vehicle. The apparatus further comprises a damper unit including a resilient device which serves to yieldably oppose rotation of the first and second components relative to each other, and the composite flywheel further includes a housing defining an annular fluid-containing chamber for a portion at least of the resilient device. The housing includes two sections which are bonded, preferably welded, to each other. The sections preferably include shells which are made of sheet metal. Such sections include portions which are located radially outwardly of the annular chamber and are welded to each other. These portions preferably include abutting radially or nearly radially extending surfaces which are welded to each other. These surfaces can be butt welded, impulse resistance welded, butt resistance welded, or discharge welded to each other. The arrangement is preferably such that the sections are welded to each other as a result of the application of heat parts of the sections to welding temperature and simultaneous application of pressure, particularly in the axial direction of the annular chamber.

The resilient device of the damper unit preferably includes arcuate coil springs which are movable relative to the sections of the housing for the chamber, and the apparatus further comprises an additional device which is adjacent and is movable relative to the sections. The apparatus preferably further comprises electrically insulating layers which are interposed between the coil springs and the additional device on the one hand and the sections of the housing on the other hand. The additional device can include a flange between the sections and retainers for the coil springs. Instead of providing coats of insulating material between the retainers and the sections, the retainers can be made of an electrically insulating material. At least one of the layers can be a phosphatized layer. For example, phosphatized layers can coat the major portions of the sections, the coil springs and/or the additional device. Alternatively, at least one of the insulating layers can consist of lacquer; this is particularly desirable in connection with the coil springs. One or more layers can also consist of a suitable ceramic or synthetic plastic material or grease.

The sections are normally movable toward each other in the axial direction of the composite flywheel in the course of the welding operation, i.e., while their abutting portions are heated to welding temperature and pressure is being applied thereto in order to establish the welded bond. In order to prevent excessive axial movements of these sections toward each other while their abutting portions are soft as a result of heating to welding temperature, the apparatus or the welding equipment can be provided with means for limiting the extent of movability of the sections toward each other only during welding.

The aforementioned electrically insulating layers or coats can be applied to the entire surface of one section or to the entire surfaces of both sections. The insulating layers are thereupon removed from, e.g., mechanically scraped off, those portions of the surfaces of the sections which are to be in contact with each other for the purpose of welding them together as well as from those portions of such surfaces which are connected with a source of electrical energy during welding.

The confronting surfaces of the sections can be provided with preferably mirror symmetrical arcuate grooves which together define an annular compartment constituting the radially outermost portion of the chamber and receiving the coil springs of the resilient device. The sections can be further provided with integral pockets which abut the end portions of the coil springs in the compartment. The making of such pockets results in the development of recesses or depressions in the external surfaces of the sections, and such recesses can constitute a means for facilitating proper orientation of the sections relative to each other during welding.

In addition to or in lieu of such recesses, at least one of the sections can be provided with readily accessible external means for facilitating its positioning with reference to the other section during welding. Such facilitating means can include suitably configurated recesses in the external surface of the one section for reception of the tips of prongs or arms forming part of the selected welding equipment.

The housing preferably constitutes a portion of or the entire first component, i.e., that component which can receive torque from the engine if the apparatus is used in the power train between the engine and the wheels of a motor vehicle.

The first component of the composite flywheel can be provided with an axial protuberance for at least one antifriction bearing which surrounds the protuberance and is surrounded by the second component of the composite flywheel. The protuberance can be welded, bolted, screwed or riveted to one section of the housing. Means can be provided on the protuberance for holding or retaining the bearing and the second component against axial movement away from the first component. The means for holding or retaining can comprise a ring and rivets, bolts, screws or like means for securing the ring to the protuberance of the first component.

The surfaces which bound the grooves of the aforementioned annular compartment preferably closely conform to the outlines of the coil springs in the compartment. The aforementioned flange is disposed between the sections and is rotatable relative to one of the components. Such flange has first portions which are disposed between the coil springs in the compartment and a second portion disposed radially inwardly of the compartment and cooperating with the sections of the housing to define one or two narrow gaps which communicate with the compartment and connect the latter with the chamber portion radially inwardly of the second portion of the flange. A torque transmitting connection or coupling can be provided between the flange and the one section of the composite flywheel, and such coupling can be designed in such a way that the flange and the one component are movable relative to each other in the axial direction of the composite flywheel. The first portions of the flange can include arms which extend radially outwardly beyond the second portion of the flange and alternate with the coil springs in the annular compartment of the chamber.

One section of the housing is remote from and the other section is nearer to the second component of the composite flywheel. The one section preferably carries a ring gear which constitutes a starter gear and is preferably welded (e.g., spot welded) to the periphery of the one section.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
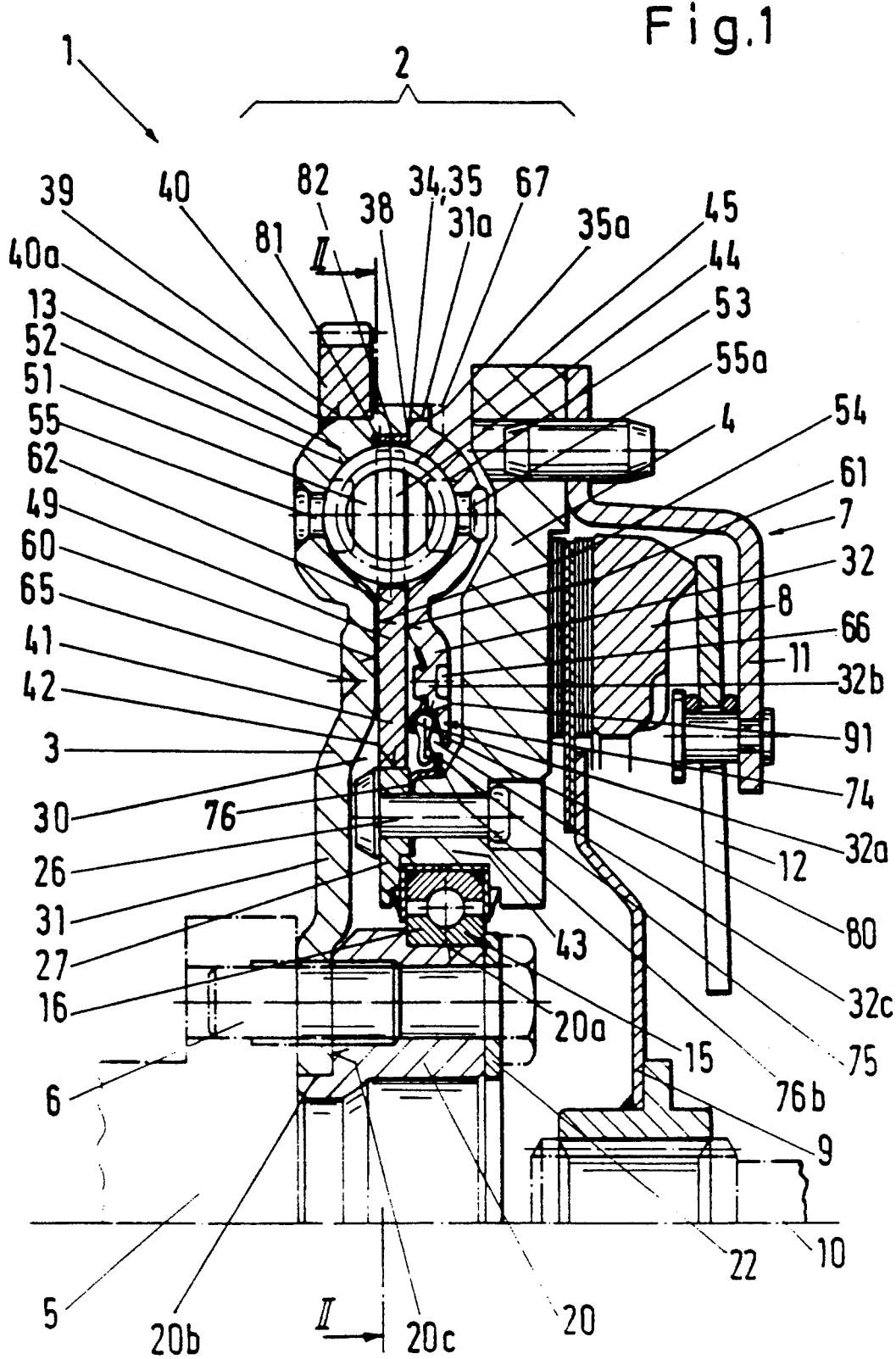
FIG. 1 is a fragmentary axial sectional view of an apparatus which embodies one form of the present invention.
Figure 2:
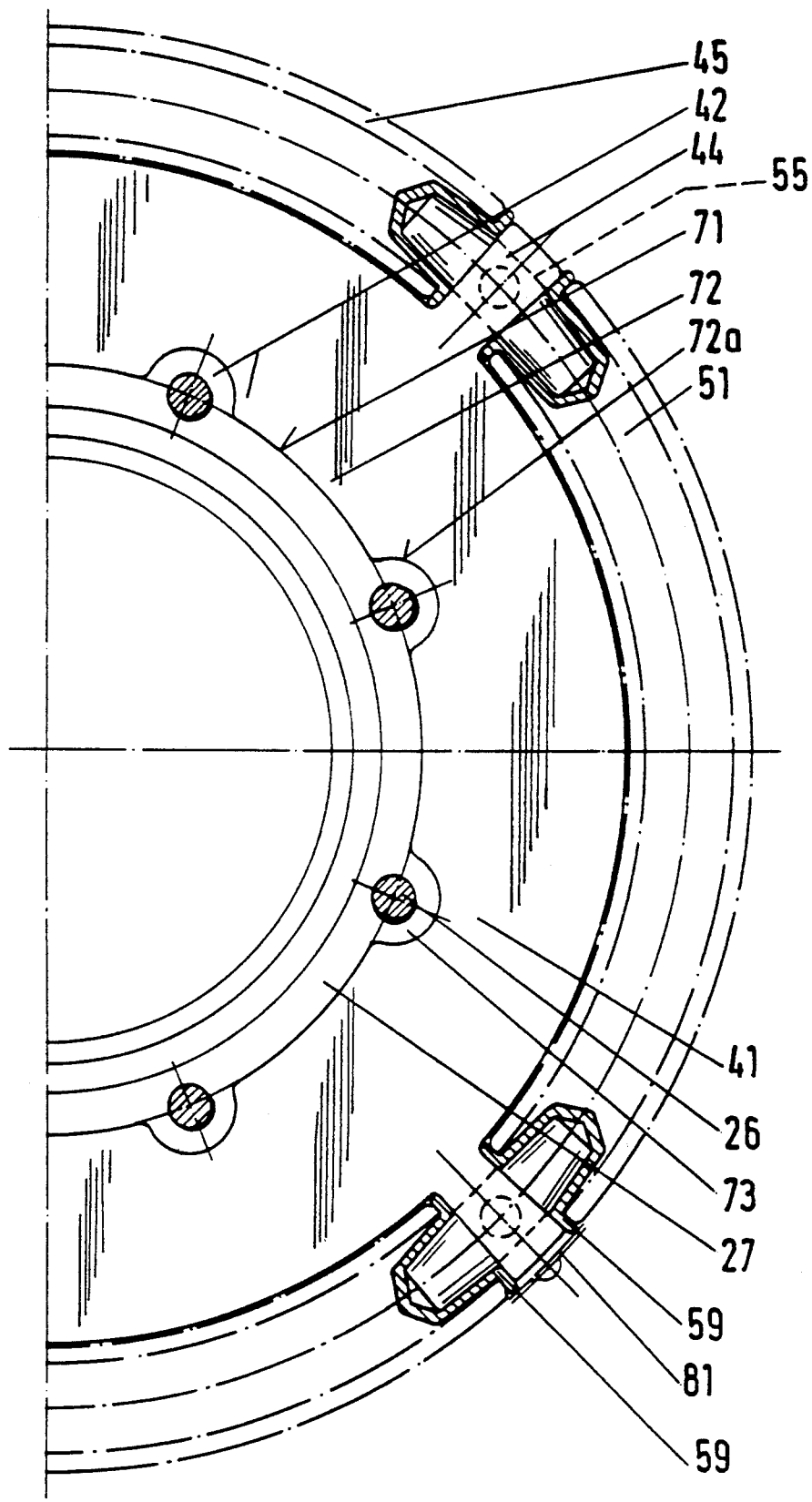
FIG. 2 is a sectional view as seen in the direction of arrows from the line II—II of FIG. 1.

Referring to FIGS. 1 and 2, there is shown a torsional vibration damping apparatus 1 which comprises a composite flywheel 2 having a first component 3 (hereinafter called flywheel) which is affixed to the output element 5 (crankshaft) of an internal combustion engine (not shown) by a set of bolts 6 or analogous fasteners, and a second component 4 (hereinafter called flywheel) which is connectable with the input element 10 of a change-speed transmission by a friction clutch 7. The clutch 7 comprises an axially movable pressure plate which is rotatable by the flywheel 4 through the medium of a cupped clutch cover 11 and is normally biased toward the adjacent friction surface of the flywheel 4 by a diaphragm spring 12 which is tiltable between two ring-shaped seats at the inner side of the cover 11. The pressure plate 8 cooperates with the flywheel 4 to transmit torque to a clutch plate or clutch disc 9 which has a hub non-rotatably surrounding the input element 10 of the change-speed transmission. The clutch plate 9 is provided with two sets of friction linings, one adjacent the flywheel 4 and the other adjacent the pressure plate 8. The means (not shown) for disengaging the clutch 7 can comprise an antifriction bearing which is movable axially of the flywheels 3, 4 against the radially inwardly extending prongs of the diaphragm spring 12 to thus change the conicity of the diaphragm spring and to enable the pressure plate 8 to become disengaged from the adjacent set of friction linings on the clutch plate 9 under the action of springs (e.g., leaf springs, not shown) which react against the clutch cover 11 or against the flywheel 4 and urge the pressure plate 8 axially and away from the flywheel 4.

The flywheels 3 and 4 are rotatable relative to each other against the opposition of a damper unit 13 (hereinafter called damper) which is installed between two annular sections 31, 32 of the flywheel 3. These sections define an annular chamber 30 for the damper 13. A bearing unit 15 including an antifriction ball bearing 16 is interposed between the flywheels 3 and 4. The inner race of the bearing 16 is mounted on an axial protuberance 20 which forms part of the flywheel 3 and extends in a direction away from the output element 5 of the engine, and the outer race of the bearing 16 is installed in a recess provided in an axial projection or extension 43 of the flywheel 4.

The sections 31, 32 are made of sheet metal and are bonded to each other by a welded seam 38 between their confronting radially extending surfaces 34 and 35. The seam or bond 38 is located radially outwardly of the chamber 30 and constitutes a component part of or the entire means for sealing the radially outermost portion of the chamber from the surrounding atmosphere. The chamber 30 serves for confinement of the damper 13 as well as for reception and storage of a supply of viscous fluid medium. In accordance with a presently preferred embodiment of the invention, the sections 31 and 32 are butt welded to each other in a pressure welding machine, in a resistance welding machine or in a discharge welding machine, i.e., in a machine wherein those portions of the sections 31, 32 which must be welded to each other are heated to welding temperature in response to the application of a low-voltage high-amperage a-c current and are united as a result of simultaneous application of axial pressure. The areas of the surfaces 34, 35 where the sections 31, 32 are joined by the welded seam 38 are a function of the strength of a-c current which is applied to the sections 31, 32 in the course of the welding operation. The current can be supplied in pulsating fashion.

The sections 31, 32 of the flywheel 3 must be accurately centered relative to each other prior to and in the course of the welding operation. This is achieved by providing the section 31 with an axially extending cylindrical centering portion or wall 31a which surrounds the welded seam 38 and the cylindrical peripheral surface 35a of the section 32. The means for maintaining the sections 31, 32 in predetermined angular positions in the course of the welding operation comprises recesses or sockets 65, 66 which are respectively machined into or otherwise formed in the external surfaces of the sections 31, 32 and serve for reception of the tips of prongs or studs (not shown) forming part of the welding equipment.

The sections 31, 32 are likely to perform at least some axial movements relative to each other, particularly during making of the welded seam 38. In order to control (limit) such axial movements, at least one of the sections 31, 32 can be provided with at least one axial stop 67 (shown in FIG. 1 on the topmost portion of the section 32 by phantom lines). The stop or stops 67 engage the adjacent end face of the cylindrical centering portion 31a in the course of the welding operation and prevent further axial movement of the sections 31 and 32 toward each other. This renders it possible to make a satisfactory welded seam even if the strength of the welding current exceeds the optimum value, i.e., even if those portions of sections 31, 32 which are adjacent their radial surfaces 34, 35 are softened to such an extent that, in the absence of abutments 67 and of the centering portion 31a, the width of the chamber 30 (in the axial direction of the flywheels 3 and 4) would be reduced below an optimum or even below a minimum acceptable value in response to the application of that pressure which is needed to ensure that the surfaces 34 and 35 are reliably and sealingly bonded to each other.

The output member of the damper 13 is a radial flange 41 which is disposed between the sections 31, 32 of the housing for the annular chamber 30, and its radially innermost portion is in torque-transmitting engagement with a disc 27 by a connection or coupling 42. The disc 27 is affixed to the end face of the axial projection 43 of the flywheel 4 by a set of rivets 26. The periphery of the flange 41 is provided with radially outwardly extending portions or arms 44 which project into an annular compartment 51 of the chamber 30. These arms alternate with arcuate energy storing elements 45 in the form of coil springs which constitute the resilient device of the damper 13 and are confined in the compartment 51. The compartment 51 includes two arcuate grooves 52 and 53 which are provided in the confronting sides or surfaces of the sections 31 and 32 and receive portions of the coil springs 45, namely those portions which extend axially of the flywheels 3, 4 beyond the respective sides of the flange 41. The latter comprises a ring-shaped portion in the form of a rib or web 49 which is located radially inwardly of the compartment 51 in a narrow passage 62 between two radially extending portions 60, 61 of the inner sides or surfaces of the sections 31, 32. The rib or web 49 defines with the surface portion 60 or 61 a relatively narrow clearance or gap 54 which constitutes the unoccupied portion of the passage 62 and provides a flow restricting path for the flow of viscous fluid medium into or from the compartment 51. The gap 54 can be provided at one side of the flange 41 or it can comprise two parts, one at each side of the flange.

FIG. 1 shows that the surfaces bounding the grooves 52, 53 in the sections 31, 32 follow rather closely the outlines of coil springs 45 in the compartment 51. This enables the radially outermost portions of the coil springs 45 to bear against the adjacent portions of surfaces which bound the grooves 52 and 53, particularly when the apparatus 1 is rotated and the coil springs 45 are acted upon by centrifugal force. In order to reduce wear upon the surfaces which bound the grooves 52 and 53, the flywheel 3 preferably contains a strip- or band-shaped member 81 which is made of, or whose outermost layer contains, a very hard material so that it can stand extensive wear. The illustrated member 81 is a short cylinder which is confined in a shallow recess 82 forming the radially outermost portion of the compartment 51. The member 81 can be made of steel, and at least that portion of this member which is immediately adjacent the radially outermost portions of the coil springs 45 is very hard and resistant to wear. Such resistance to wear is particularly important when the apparatus 1 is rotated at an elevated speed so that the coil springs 45 are acted upon by a pronounced centrifugal force which maintains them in frictional contact with the internal surface of the cylindrical member 81. The coil springs 45 actually rub against the member 81 when they are caused to store or dissipate energy, i.e., when the flywheel 4 performs an angular movement relative to the flywheel 3 and/or vice versa.

Each coil spring 45 in the compartment 51 is confined between one of the arms 44 on the flange 41 and two abutments or stops 55, 55a which are respectively affixed to the sections 31, 32 and extend into the respective grooves 52, 53. In the apparatus of FIGS. 1 and 2, the length of each abutment 55 or 55a in the circumferential direction of the flywheel 3 equals or approximates the length of an arm 44.

FIG. 2 shows that each of the arms 44 is flanked by two cup-shaped retainers 59 which extend into the respective end portions of the adjacent coil springs 45. The peripheral surfaces of the retainers 59 are closely adjacent the adjacent portions of surfaces bounding the grooves 52 and 53. Thus, the retainers 59 can be said to constitute plungers or pistons which displace the fluid medium in the compartment 51 when they are compelled to move relative to the sections 31, 32 and/or vice versa.

The apparatus 1 of FIGS. 1 and 2 comprises a damper 13 with four coil springs 45 each of which extends along an arc of approximately 82 degrees (in the neutral angular positions of the flywheels 3 and 4 with reference to each other). It is presently preferred to select the combined length of the coil spring 45 in such a way that they jointly extend along approximately 90 percent of a complete circle.

In order to reduce the likelihood of development of internal stresses in the coil springs 45, they are preferably shaped to assume a curvature resembling or matching that of the compartment 51 prior to insertion into the chamber 30. These coil springs dip into or are completely immersed in the supply of fluid medium which is confined in the chamber 30. The fluid medium is a viscous substance which is preferably a lubricant and can have a pasty consistency (i.e., the chamber 30 can confine a supply of grease). When the apparatus 1 rotates and the fluid medium is under the action of centrifugal force, it fills a predetermined part of the radially outermost or outer portion of the chamber 30, preferably not less than the entire compartment 51.

FIG. 2 shows that the flange 41 has a central opening 71 bounded by an annulus of radially inwardly extending tooth-like projections 72 in mesh with complementary tooth-like projections 73 extending radially outwardly at the periphery of the disc 27. The projections 72 and 73 jointly form the aforementioned connection or coupling 42 which can transmit torque from the disc 27 (i.e., from the flywheel 4) to the flange 41 and vice versa. The projections 73 are received in tooth spaces 72a which alternate with the projections 72 of the flange 41. The shanks of the rivets 26 (which connect the disc 27 with the projection 43 of the flywheel 4) extend through openings in the projections 73 of the disc 27. An advantage of the connection or coupling 42 is that it allows for proper orientation of the flange 41 with reference to the sections 31, 32 of the housing for the chamber 30; this renders it possible to reduce the width of the gap 54 and to thus ensure that the parts defining this gap (namely the web or rib 49 of the flange 41 and the sections 31, 32) constitute a flow restrictor which can effectively oppose rapid flow of fluid medium from and into the compartment 51. Moreover, the connection or coupling 42 renders it possible to avoid the making of parts including the flange 41, the disc 27 and the neighboring elements with a very high degree of precision.

The means for sealing the radially innermost portion of the chamber 30 from the atmosphere comprises a sealing device 74 which is installed between the radially innermost portion 32a of the section 32 and the adjacent portion of the flywheel 4. The illustrated sealing device 74 comprises a washer-like sealing member 75 which is coated with a plastic material and is installed in axially stressed condition. The outer marginal portion of the sealing member 75 is installed in a ring-shaped socket or notch 91 of the radially innermost portion 32a of the section 32 and is held therein by a carrier 80 which is secured to the portion 32a of the section 32 by rivets 32b.

The portion 32a of the section 32 extends radially inwardly beyond the outer marginal portion of the sealing member 75 so that the parts 75 and 32a define a ring-shaped space 32c which is adjacent the outer side of the sealing member 75 and gathers viscous fluid medium which happens to escape from the radially innermost portion of the chamber 30 along the outer marginal portion and/or along the inner marginal portion of the sealing member 75. The inner marginal portion of the sealing member 75 bears against the dished outer marginal portion 76b of an annular insert 76 which has an inner marginal portion sealingly clamped between the disc 27 and the projection 43 of the flywheel 4. The quantity of escaped fluid medium which gathers in the space 32c is very small and, when the RPM of the apparatus 1 is very high, centrifugal force acting upon the escaped fluid medium forces it back into the chamber 30 along the outer marginal portion of the sealing member 75 and through the socket 91. The dished outer marginal portion 76b of the insert 76 is located radially inwardly of and in axial alignment with the space 32c to thus ensure that the fluid medium which leaks between the inner marginal portion of the sealing member 75 and the portion 76b enters the space 32c and can be automatically forced back into the chamber 30 by centrifugal force. The socket 91 is bounded by a concave surface which enables the outer marginal portion of the sealing member 75 to become tilted so that the member 75 assumes a frustoconical shape and acts not unlike a diaphragm spring by reacting against the carrier 80 while bearing against the flywheel 4.

The protuberance 20 is a discrete part of the composite flywheel and is affixed to the section 31 by the aforementioned set of fasteners 6 which serve to connect the flywheel 3 to the output element 5 of the engine. The protuberance 20 has a cylindrical peripheral surface 20b which centers the section 31, and the latter abuts a radially extending annular shoulder 20c of the protuberance 20.

The fasteners 6 need not necessarily constitute a means for connecting the section 31 to the protuberance 20 of the flywheel 3. For example, the radially innermost portion of the section 31 can be a tight press fit on the protuberance 20 or the latter can be riveted, welded or separably connected to the section 31 by a discrete set of screws, rivets, bolts or other fasteners.

In assembling the apparatus 1, the sealing member 75 is mounted on the flywheel 3 and the antifriction bearing 16 is mounted in the flywheel 4 before the flywheels 3 and 4 are coupled to each other. Such coupling operation involves pushing the inner race of the bearing 16 onto the cylindrical peripheral surface 20a of the protuberance 20 and thereupon applying a washer-like retaining ring 22 which is held in abutment with the end face of the protuberance 20 by the fasteners 6. The connection or coupling 42 between the flange 41 and the disc 27 is established in automatic response to slipping of the inner race of the bearing 16 onto the protuberance 20. The assembly of the flywheels 3, 4 with each other involves at least some axial stressing of the elastic sealing member 75 by the outer marginal portion 76b of the insert 76 so that the sealing device 74 provides a reliable sealing action between the radially innermost portion of the chamber 30 and the atmosphere.

If it is desired to assemble the section 31 with the protuberance 20 prior to coupling of the flywheel 4 to the flywheel 3, the retaining ring 22 is affixed to the protuberance 20 by fasteners (e.g., rivets, bolts or screws) other than the illustrated bolts 6.

In order to ensure that welding of the sections 31, 32 to each other along their abutting radial surfaces 34 and 35 will not result in the establishment of permanent connections between other parts of the apparatus 1 as a result of heating to welding temperature and the application of pressure, certain parts (especially those parts which should be free to move relative to the sections 31, 32) are provided with coats, layers or films of an electrically insulating material. The parts which should remain free to move relative to the sections 31, 32 include the coil springs 45 of the damper 13, the abutments 55, 55a, the cupped spring retainers 59 and the flange 41, i.e., these parts are preferably coated with a suitable insulating material. Alternatively, or in addition to coating of the parts 45, 55, 55a, 41 and 59, it is possible to provide electric insulating coats, layers or films on those portions of the sections 31 and 32 which should not or need not be welded to each other. It is not necessary to coat all such surfaces of the sections 31, 32 and/or parts 41, 45, 55, 55a and 59 with insulating material; it suffices to coat those portions which are likely or most likely to be bonded to neighboring parts in response to welding of the sections 31 and 32 to each other. The insulating operation can involve phosphating selected surfaces on the sections 31, 32 and/or selected surfaces of the parts 41, 45, 55, 55a and 59. Alternatively, certain parts (such as the abutments 55, 55a and the retainers 59) can be made of a non-conductive material (e.g., a synthetic plastic substance). The coil springs 45 can be coated with insulating layers or films of lacquer. The flange 41 and selected portions of the sections 31, 32 are preferably insulated by phosphating. Alternatively or in addition to such insulation applying operations, the insulating step or steps can involve the application of coats of ceramic material, synthetic plastic material and/or grease; this applies in particular for the coating of selected portions of surfaces on the sections 31 and 32.

It is often more economical or faster to coat (e.g., phosphatize) the entire part or parts which require insulation in the course of the welding operation. The application of insulating layers is then followed by partial removal of insulation in regions where the respective part or parts must conduct current, i.e., at 38 and where the sections 31, 32 are to be connected with an energy source. For example, it is possible to phosphatize the entire section 31 and/or 32 and to thereupon mechanically remove the insulating layer in the regions of surface portions 34, 35. The removal of portions of insulating layers can be carried out in grinding or other suitable material removing machines.

It is desirable to select insulating materials which are compatible with the viscous fluid medium in the chamber 30.

The utilization of insulating layers of phosphate is preferred at this time because such layers exhibit highly desirable wear-resistant and self-lubricating properties.

The periphery of the section 31 is provided with a cylindrical surface 39 for a ring-shaped starter gear 40 which is preferably welded to the flywheel 3, as at 40a. The welded connection can constitute an annulus of discrete spot welds, a circumferentially complete welded seam or a series of arcuate welded seams. Welding at the location 40a as shown in the upper portion of FIG. 1 is advantageous because the section 31 is made of relatively thin sheet metal so that the thickness of the starter gear 40 exceeds the thickness of the section 31 and these parts define an annular space which is adjacent the internal surface of the gear 40 and can receive discrete spot welds, arcuate welded seams or a circumferentially complete welded seam.

FIG. 1 shows that the thickness of the section 31 need not match the thickness of the section 32. In the apparatus 1, the section 31 is thicker than the section 32.

The operation of the apparatus 1 is as follows:

If the flywheel 4 is caused to perform an angular movement relative to the flywheel 3, i.e., if one of the flywheels 3, 4 leaves the neutral or starting position of FIG. 2, the connection or coupling 42 causes the disc 27 to turn the flange 41 with reference to the sections 31 and 32 so that the coil springs 45 in the compartment 51 are compressed by the arms 44 in cooperation with the corresponding abutments 55, 55a. The springs 45 thereby generate a frictional damping action because their convolutions rub against the surfaces bounding the grooves 52 and 53. The intensity of such frictional damping action increases in response to increasing rotational speed of the apparatus 1, i.e., in response to an intensification of centrifugal force acting upon the coil springs 45.

A second damping action is produced as a result of agitation and displacement of viscous fluid medium in the chamber 30 by the flange 41 and its arms 44 as well as by the coil springs 45 and abutments 55, 55a and retainers 59. The viscous or hydraulic damping action of the fluid medium is especially pronounced in the compartment 51 because the retainers 59 act not unlike plungers or pistons and move the adjacent mass of fluid medium in the circumferential direction of the flywheel 3. When the coil springs 45 are caused to store energy (or to store additional energy if they are installed in prestressed condition), the retainers 59 at the arms 44 of the flange 41 are moved toward those retainers 59 (if any) which engage the corresponding abutments 55 and 55a whereby the fluid medium which is confined within the convolutions of the coil springs 45 is compelled to escape mainly radially inwardly through the respective portions of the gap 54 and to flow into the chamber portion radially inwardly of the web or rib 49 of the flange 41. The parts which define the gap 54 act not unlike a flow restrictor and cause the fluid medium to produce a pronounced hydraulic or viscous damping action.

A further damping action is produced as a result of leakage of some fluid medium between the peripheries of the retainers 59 and the adjacent surfaces bounding the grooves 52 and 53.

When the coil springs 45 cease to store energy (i.e., when the angular displacement of the flywheel 3 relative to the flywheel 4 and/or vice versa is interrupted or terminated) while the apparatus 1 continues to rotate so that the fluid medium is acted upon by centrifugal force, the medium flows through the gap 54 and radially outwardly back into the compartment 51 as soon as the coil springs 45 are free to dissipate energy whereby the parts which define the gap 54 again produce a desirable hydraulic or viscous damping action by opposing rapid flow of fluid medium back into the compartment 51. At such time, the retainers 59 also produce a damping action because some of the fluid medium in the compartment 51 flows along the peripheral surfaces of the retainers 59 in order to completely fill the radially outermost portion of the chamber 30. The damping action which is produced by the fluid medium is a function of the magnitude of centrifugal force, i.e., such damping action can be enhanced by increasing the RPM of the apparatus 1.

The damping action can be regulated in a number of ways. For example, the peripheral surfaces of one or more retainers 59 can be provided with notches, grooves or other passages for the flow of fluid medium. Moreover, one or more retainers 59 can be provided with axial or axially parallel bores or holes for the fluid medium. The width of the gap 54 can be altered or selected with a view to produce a predetermined damping action whenever the fluid medium is compelled to flow radially inwardly from or radially outwardly into the compartment 51. Such undertakings enable the manufacturer to conform the damping action to the intended use of the improved apparatus in a power train or the like. Additional regulation of the damping action can be achieved by reducing the number of retainers 59, i.e., by removing one or both retainers from one or more arms 44 and/or by removing one or more retainers which engage the abutments 55, 55a.

Figure 3:
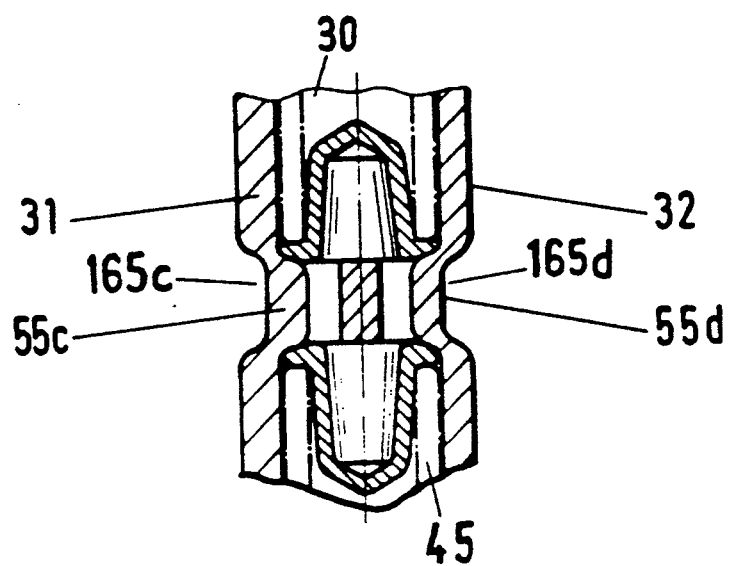
FIG. 3 is a fragmentary axial sectional view of a modified apparatus.

FIG. 3 shows that the separately produced abutments 55, 55a of the apparatus 1 can be replaced by abutments or stops 55c, 55d which are integral parts of the respective sections 31 and 32. The abutments 55c, 55d are actually pockets which are provided by depressing certain portions of the sections 31 and 32 so that the depressed portions can serve as abutments for adjacent end portions of coil springs 45 of the damper in the chamber between the sections 31 and 32. The provision of pocket-like integral abutments 55a and 55d obviates the need for the recesses 65 and 66 of FIG. 1, i.e., the prongs of welding implements can extend into the recesses or depressions 165c and 165d which develop at the outer sides of the sections 31 and 32 as a result of the making of abutments 55a and 55d. All that is necessary is to conform the tips of the welding instrumentalities to the depth and other dimensions of the depressions 165c and 165d which are outwardly adjacent the abutments 55c, 55d or to configurate these depressions in such a way that they can take the tips of prongs on existing welding instrumentalities. The prongs can constitute electrodes which connect the sections 31, 32 of FIG. 3 with a source of welding current in the course of the welding operation. Moreover, the prongs which enter the recesses 65, 66 of FIG. 1 or the 55c, 55d in FIG. 3 can be used as a means for applying to the sections 31 and 32 axial pressure during welding of their abutting surface portions to each other. In addition, the prongs of the welding instrumentalities can replace the axial stop or stops 67 of FIG. 1, i.e., the prongs which enter the depressions 165c, 165d at the outer sides of the abutments 55c, 55d can be mounted and moved in such a way that they apply the necessary pressure during welding but cannot move nearer to each other than is necessary to ensure that the width of the chamber 30 between the sections 31, 32 of FIG. 3 will not exceed a maximum permissible value. As mentioned above, the chamber 30 (and especially the compartment 51 for the coil springs 45 of the damper in the chamber) must have a certain minimum width in order to ensure that the coil springs can expand or contract by moving their convolutions in the circumferential direction of and relative to the surfaces bounding the arcuate grooves in the sections 31 and 32. Moreover, and as also explained above, the width of the chamber 30 between the sections 31, 32 cannot be reduced beyond a certain minimum value which would eliminate the gap 54 between the flange 41 and the adjacent surface portion 60 and/or 61 because the gap 54 should allow for some flow of viscous fluid medium into and from the compartment 51 in order to ensure that such fluid medium will be capable of producing a desirable hydraulic or viscous damping action.

The improved apparatus can be modified in a number of additional ways. For example, the coil springs 45 can form two or more groups each of which begins to store energy during a different stage of angular displacement of the flywheel 4 relative to the flywheel 3 and/or vice versa. This can be achieved by making one or more arms 44 longer or shorter (as seen in the circumferential direction of the flywheel 3) than the corresponding abutments 55, 55a or 55c, 55d. Moreover, one or more arms 44 can be longer (in the circumferential direction of the flywheel 3) than the other arms or arm. Still further, the apparatus can comprise at least one second damper which is installed radially inwardly of the damper 13, for example, in a manner as disclosed in the aforementioned copending patent application Ser. No. 626,384 of Friedman and Jäckel for "Apparatus for damping vibrations". The dampers of the improved apparatus can operate in parallel or in series.

An important advantage of the improved apparatus is that the radially outermost portion of the chamber 30 is automatically sealed from the atmosphere when the welding of the sections 31, 32 to each other is completed. Thus, it is not necessary to provide discrete sealing devices radially outwardly of the coil springs 45 in the compartment 51. The welded connection 38 is highly reliable and long-lasting. Butt welding is one of presently preferred modes of establishing a permanent connection between the sections 31, 32 in the region radially outwardly of the compartment 51. Such welding is made possible because the sections 31, 32 are preferably made of a metallic sheet material, e.g., in a suitable stamping or like machine.

It is preferred to make the sections 31 and 32 of a material (e.g., steel) which has a low carbon content. It suffices if the carbon content is low in those regions of the surfaces 34, 35 which are actually welded to each other at 38.

The provision of the chamber 30 in the flywheel 3 (i.e., in the flywheel which is connected with the output element 5 of the engine and is remote from the friction clutch 7) is desirable and advantageous because the supply of viscous fluid medium in the chamber 30 is less likely to be affected by heat which is generated during engagement or disengagement of the clutch 7. The arrangement can be such that the sections 31 and 32 constitute the entire flywheel 3. This contributes to simplicity and lower cost of the apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for damping vibrations, comprising at least two compartments which are rotatable relative to each other and include a first component connectable with an engine and a second component connectable to a power train, one of said at least two components consisting of at least two sections constituting a housing which defines a chamber for a supply of viscous fluid which at least partially fills said chamber, said chamber having a radially outer portion; a damper unit including a plurality of springs disposed in said radially outer portion of said chamber and extending in the circumferential direction of said components, said springs having radially outermost portions and said at least two sections having portion adjacent and at least substantially conforming to the outlines of said radially outermost portions of said springs to limit the extent of radially outward movement of said springs under the action of centrifugal force when said components are rotated; a starter gear provided directly on one of said at least two sections and said one section being of one piece; and a welded seam which bonds said at least two sections to each other.

2. The apparatus of claim 1, wherein said sections include shells of sheet metal.

3. The apparatus of claim 1, wherein said chamber is an annular chamber and said portions of said at least two sections are bonded to each other by said seam.

4. The apparatus of claim 1, wherein said at least two sections have abutting substantially radially extending surfaces which are bonded to each other by said seam.

5. The apparatus of claim 1, wherein said springs are coil springs.

6. The apparatus of claim 1, wherein said at least two sections are movable toward each other in the course of bonding them to each other and further comprising stop means for limiting the extent of movability of the at least two sections toward each other only during bonding.

7. The apparatus of claim 1, wherein said at least two sections have confronting surfaces and arcuate grooves provided in said surfaces and together forming an annular compartment constituting said radially outer portion of said chamber, said spring including coil springs in said compartment and said coil springs having end portions, said at least two sections further comprising pockets extending into said compartment adjacent the end portions of said springs, said at least two sections further having external recesses adjacent said pockets and constituting a means for facilitating orientation of said at least two sections relative to each other during bonding.

8. The apparatus of claim 1, wherein at least one of said at least two sections has means for facilitating its positioning with reference to the other of said at least two sections during bonding of said at least two sections to each other.

9. The apparatus of claim 8, wherein said at least two sections have external surfaces facing away from each other and said facilitating means includes at least one recess in the external surface of said one section.

10. The apparatus of claim 1, wherein said housing constitutes a portion of said first component.

11. The apparatus of claim 1, wherein said first component has an axial protuberance extending toward said second component, and further comprising at least one antifriction bearing surrounding said protuberance, said second component having a portion which surrounds said bearing.

12. The apparatus of claim 11, further comprising a retaining device provided on said protuberance and arranged to hold said bearing against axial movement relative to said first component.

13. The apparatus of claim 1, wherein said at least two sections have confronting arcuate grooves defining an annular compartment which constitutes said radially outer portion of said chamber, said springs including coil springs in said compartment and said at least two sections having surfaces bounding said grooves and closely conforming to the outlines of the springs in said compartment, said damper unit further including a flange rotatably with other of said first and second components and having first portions extending into said compartment between said springs, said flange further including a second portion disposed between said at least two sections radially inwardly of said compartment, said second portion of said flange and said at least two sections defining at least one narrow gap which communicates with said compartment.

14. The apparatus of claim 13, further comprising torque-transmitting coupling device provided between said flange and said other component, said flange being movable axially with reference to said other component.

15. The apparatus of claim 13, wherein said first portions include arms extending radially outwardly from the second portion of said flange.

16. The apparatus of claim 1, wherein one of said at least two sections is nearer to and the other of said at least two sections is more distant from said second component, said starter gear surrounding said other section and being welded thereto.

17. The apparatus of claim 16, wherein said gear is spot welded to said other section.

* * * * *

UNITED STATES PATENT AND TRADEMARK OFFICE
CERTIFICATE OF CORRECTION

PATENT NO. : 5,242,328
DATED : September 7, 1993
INVENTOR(S) : Oswald FRIEDMANN and Egon ZAPF It is certified that error appears in the above-indentified patent and that said Letters Patent is hereby corrected as shown below:

Col. 13, Claim 1, line 13, change "compartments" to --components--.

Signed and Sealed this

Thirteenth Day of June, 1995

Attest:

BRUCE LEHMAN

*Attesting Officer*  *Commissioner of Patents and Trademarks*